(12) United States Patent
Ebeling, Sr.

(10) Patent No.: US 7,178,298 B1
(45) Date of Patent: Feb. 20, 2007

(54) BUILDING CONSTRUCTION SYSTEM AND METHOD

(76) Inventor: Albert Ebeling, Sr., 1716 N. Apperson, Kokomo, IN (US) 46901

( * ) Notice: Subject to any disclaimer, the term of this patent is extended or adjusted under 35 U.S.C. 154(b) by 0 days.

(21) Appl. No.: 11/405,126

(22) Filed: Apr. 17, 2006

(51) Int. Cl.
*E02D 27/00* (2006.01)

(52) U.S. Cl. .................... 52/293.3; 52/285.3; 52/169.9

(58) Field of Classification Search ................ 411/433, 411/437; 52/293.3, 285.3, 169.9, 169.13, 52/DIG. 1
See application file for complete search history.

(56) References Cited

U.S. PATENT DOCUMENTS

| | | | | |
|---|---|---|---|---|
| 1,069,451 A | * | 8/1913 | Marston | 411/437 |
| 3,456,705 A | * | 7/1969 | Tinnerman | 411/437 |
| 4,189,808 A | * | 2/1980 | Brown | 24/30.5 R |
| 4,828,444 A | * | 5/1989 | Oshida | 411/437 |
| 4,999,019 A | * | 3/1991 | Kraus | 411/512 |
| 5,081,811 A | * | 1/1992 | Sasaki | 52/223.13 |
| 5,098,242 A | * | 3/1992 | Schaty | 411/437 |
| 5,423,647 A | * | 6/1995 | Suzuki | 411/433 |
| 5,707,193 A | * | 1/1998 | Hasegawa | 411/433 |
| 5,816,762 A | * | 10/1998 | Miura et al. | 411/433 |
| 6,318,875 B1 | * | 11/2001 | Hrabar et al. | 362/119 |
| 6,997,662 B2 | * | 2/2006 | Nishikawa | 411/437 |

* cited by examiner

*Primary Examiner*—Naoko Slack
*Assistant Examiner*—Basil Katcheves
(74) *Attorney, Agent, or Firm*—Daniel J. O'Connor

(57) ABSTRACT

A building construction system and method which includes an attachment or fastener device and a tool element for applying the device to a lower reinforcing rod. The reinforcing rod is part of a building section which includes a wood or lumber section and a lower concrete layer. The attachment device is utilized to securely retain a lumber section to a lower concrete area. The overall design is such that construction and labor time is significantly reduced.

1 Claim, 3 Drawing Sheets

BUILDING CONSTRUCTION SYSTEM AND METHOD

BACKGROUND AND OBJECTS OF THE INVENTION

The present invention is generally related to the building and construction arts and, in particular, to a system and method for securely fastening a wood or lumber section to a lower concrete substrate.

As is known in the art, wooden two×four sections are attached to a lower concrete area via a reinforcing rod, or re-rod, to which is attached a conventional nut and washer.

Especially in construction involving a large number of reinforcing rods and nuts to be attached thereto, the process becomes very labor intensive and time consuming.

Accordingly, it is an object of the invention to describe a novel attachment or fastening device which is capable of securing a lumber section to a lower concrete substrate without the time-consuming and costly processes of the prior art.

It is a further object to set forth a nut, fastener or attaching device which is specially designed to be pushed on to a reinforcing rod, or re-rod, used in combination with a lumber or wood section and a lower concrete area.

It is a still further object of the invention to show a nut, fastener or attaching device which is used in combination with a specially designed tool for most efficient application of the attaching device to a construction or building system of the type shown herein.

It is also an object to present a nut, fastener or attaching device which, although specialized for a particular construction use, may be economically mass-produced for widespread commercial appeal in the construction and building arts.

These and other objects and advantages of the invention will be apparent to those of skill in the art from the description which follows.

PRIOR ART PATENTS AND DESIGNS

The combined invention, as utilized in a building construction, is believed to be classified in U.S. Patent Office Class 52.

A generally related U.S. Pat. No. 4,828,444 shows a plastic push-on nut which has some features in common with the present invention.

The present invention, as specifically applied to the building construction industry, is submitted to be patentable over all known prior art systems and methods of use.

The attachment device of the present invention is also utilized in combination with a specially designed application tool which is sized for optimal efficiency.

SUMMARY OF THE INVENTION

A specially designed attachment device is utilized in combination with a building construction to hold wooden lumber sections onto a lower concrete substrate.

The attachment device, fastener or nut includes a lower pressure plate sized at about two inches by two inches and having an aperture formed therein for placement over a reinforcing rod also known in the art as a re-rod.

The attachment device includes spring arm elements which extend from the edges of the pressure plate.

The attaching device also has guiding and supporting arms extending vertically from the lower pressure plate. The device is used in combination with a driving tool of about six inches in length.

BRIEF DESCRIPTION OF THE DRAWING FIGURES

FULL DESCRIPTION OF THE PREFERRED EMBODIMENTS

Figure 1:
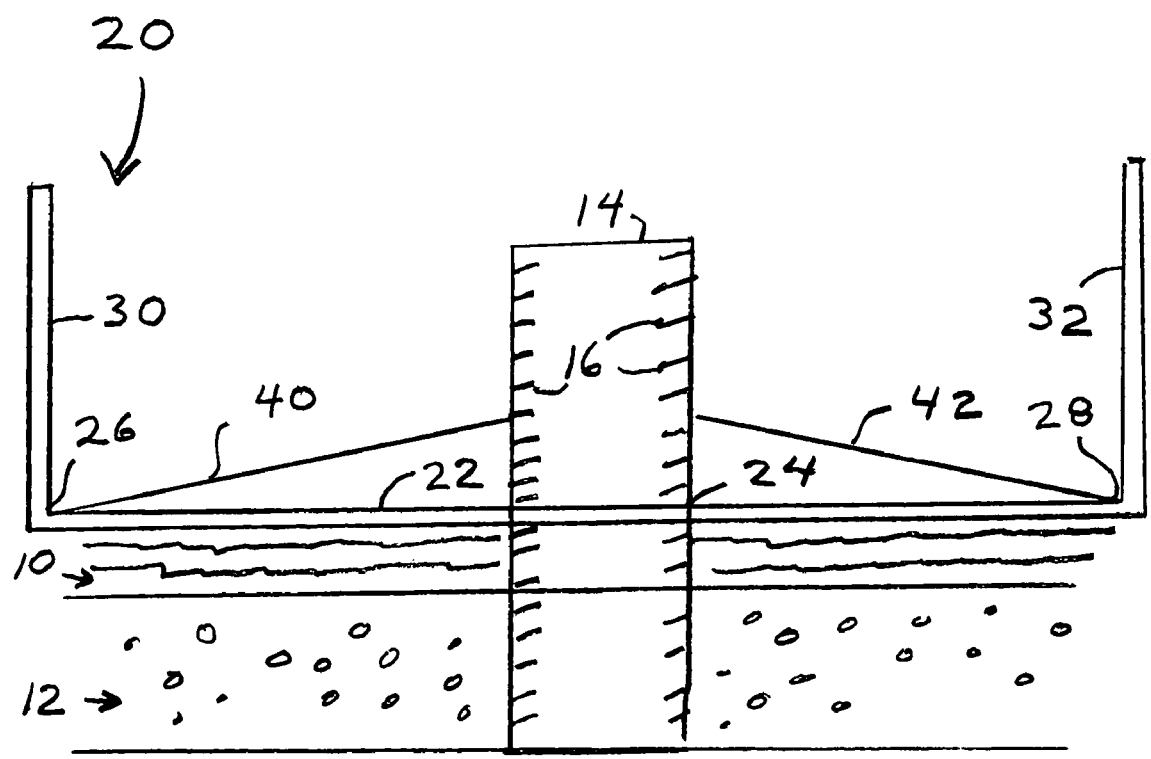
FIG. 1 is a side schematic view of the attachment device or fastener as it is utilized in combination with a lumber or wood section and a lower concrete layer. The combined reinforcing rod is also illustrated.

Referring to the drawing figures, FIG. 1 shows a side schematic view of the attachment device, fastener or nut 20 as it is used in combination with portions of a building structure.

The parts of a building structure which are known in the art are the wood or lumber element shown as numeral 10, a concrete substrate indicated at numeral 12, and a reinforcing rod at numeral 14. The reinforcing rod is also known in the art as a re-rod.

The reinforcing rod 14 has thread elements 16 formed thereon. In practice, the reinforcing rod 14 would have a diameter of ⅜ inch or greater as is known in the building construction arts.

In actual practice, the wood or lumber section would extend for many feet and be comprised of, for example, an elongated two-by-four. Also in practice, a large number of reinforcing rods 14 would be utilized.

Referring again to FIG. 1, the overall fastener or attachment device 20 is shown as having a lower pressure plate 22.

Pressure plate 22 has a circular aperture 24 formed in the middle thereof and, as viewed in FIG. 1, a left hand edge 26 and a right hand edge 28.

The device 20 further includes a left hand guiding and supporting arm 30 which extends vertically from the left hand edge 26.

Also shown is a right hand guiding and supporting arm 32 which extends vertically from the right hand edge area 28.

The attachment device 20 further has a first spring arm element 40 extending from the left hand edge 26 to the threaded area 16 of reinforcing rod 14. A second spring arm element 42 extends from the right hand edge 28 to the threaded area 16 of the reinforcing rod 14.

Figure 2:
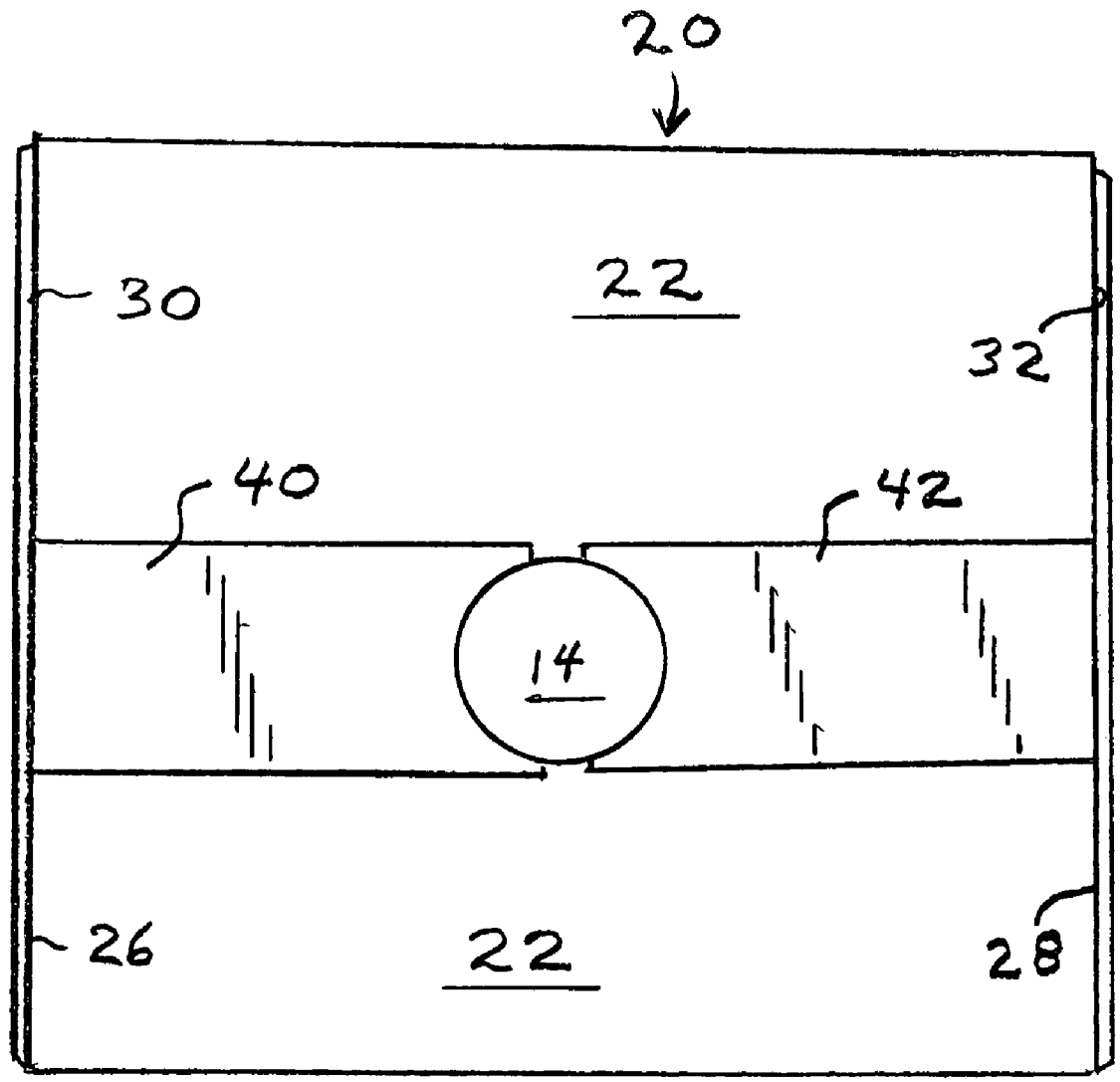
FIG. 2 is a top schematic view of the attachment device and illustrates the sizing of the lower pressure plate. The position of the spring arm elements is also shown.

Referring to the top schematic view of FIG. 2, the attachment device 20 is shown as having a square-shaped pressure plate 22.

FIG. 2 further shows the left hand and right hand edge members at 26 and 28.

Vertically extending guiding and supporting arms 30 and 32 are also indicated.

The first and second spring arm elements 40 and 42 are also shown as extending to the central reinforcing rod 14.

The dimensions of a typical attachment device 20 are important and critical to the overall system and method utilized.

For example, it is critical that pressure plate 22 exert enough force on the wood or lumber section to retain it securely against the lower concrete layer.

Thus, assuming a reinforcing rod of ⅜ inch diameter, the pressure plate 22 would be 2 inches by 2 inches. Arms 30 and 32 would be ½ inch high.

Figure 3:
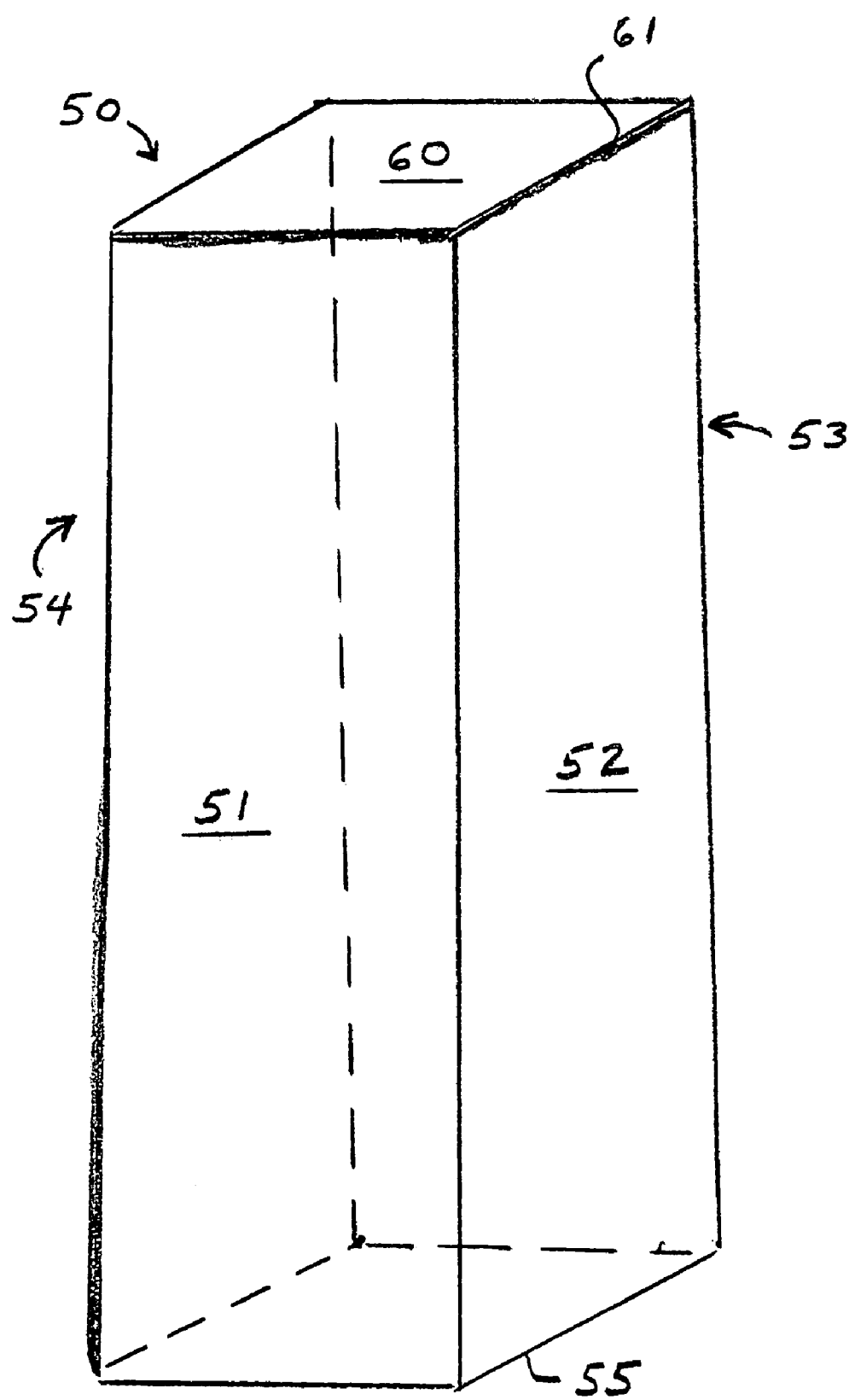
FIG. 3 shows the driver tool utilized to affix the attachment device to a reinforcing rod element and thereby retain a section of lumber securely against a lower concrete area.

FIG. 3 shows the driver or driving tool used in combination with the attachment device of the invention. The overall driver is indicated at numeral 50.

The driver 50 has four sides 51–54 and has a square cross-section.

The lower end of the driver, at numeral 55, is open so it can be utilized to push down on the attachment device 20 to affix it to the threaded reinforcing rod 14.

The upper end of the driver tool has a metal cap 60 placed thereon via weld indicated at 61.

The tool 50 is approximately six inches in overall length.

For this particular example, the walls of tool 50 are 1¾ by 1¾ inches so as to be able to act on the inside of the attaching device 20 which has a base size of 2 by 2 inches.

The method steps used in practice of the overall invention are as follows:

A) Provide an attachment device of the configuration shown in FIGS. 1 and 2,
B) Place the attachment device over a reinforcing rod which extends upwardly from a lower wood section which overlies a concrete substrate,
C) Provide a driver tool of the configuration and sizing indicated in FIG. 3,
D) Apply the driver tool to the attachment device to affix it to the reinforcing rod and thus retain the lumber section securely to the lower concrete layer.

While a particular system and method of use have been described and illustrated, it is intended in this specification to broadly cover all equivalent systems and methods of use which would reasonably occur to those of skill in the art.

I claim:

1. A building construction system comprising:

an attachment device which holds a wooden construction element to a lower concrete area, said attachment device comprising a lower pressure plate which contacts said wooden construction element, said pressure plate having a circular aperture formed in the middle thereof, said pressure plate having a left hand edge and a right hand edge, a left hand guiding and supporting arm extending vertically from said left hand edge, a right hand guiding and supporting arm extending vertically from said right hand edge, said attachment device having a first spring arm element extending from said left hand edge and a second spring arm element extending from said right hand edge, said attachment device being in combination with a reinforcing rod in a building structure, the building construction system as recited and further including, in combination, a tool for driving the attachment device onto the reinforcing rod, said tool comprising a metal element of about six inches in length and having a generally square cross section of less than two inches by less than two inches, said tool being open on one end and having a metal cap welded to a second end thereof.

* * * * *